United States Patent [19]
Krueger et al.

[11] Patent Number: 5,220,576
[45] Date of Patent: Jun. 15, 1993

[54] SLAB OR STRIPLINE LASER

[75] Inventors: Hans Krueger, Munich; Walter Kirschner, Unterfoehring, both of Fed. Rep. of Germany

[73] Assignee: Siemans Aktiengesellschaft, Munich, Fed. Rep. of Germany

[21] Appl. No.: 751,556

[22] Filed: Aug. 29, 1991

[30] Foreign Application Priority Data

Sep. 26, 1990 [DE] Fed. Rep. of Germany ....... 4030443

[51] Int. Cl.$^5$ .............................................. H01S 3/097
[52] U.S. Cl. ........................................ 372/87; 372/82; 372/107
[58] Field of Search ............................ 372/87, 82, 107

[56] References Cited

U.S. PATENT DOCUMENTS

| | | |
|---|---|---|
| 4,503,542 | 3/1985 | Cirkel et al. ......................... 372/87 |
| 4,575,855 | 3/1986 | Council ................................ 372/87 |
| 4,713,825 | 12/1987 | Adsett . | |
| 4,723,255 | 2/1988 | Cohn et al. ......................... 372/87 |
| 4,989,217 | 1/1991 | Ostler ................................. 372/107 |
| 5,070,513 | 12/1991 | Letardi ............................... 372/87 |

*Primary Examiner*—John D. Lee
*Assistant Examiner*—Robert E. Wise

[57] ABSTRACT

Slab or stripline laser. In a slab or stripline laser that contains two electrodes (1, 26) and two resonator mirrors (2, 3), the electrodes (1, 26) are executed shape-stable and the mirrors (2, 3) and a second electrode (26) are secured to and carried by the first electrode (1). The invention is suitable for compact stripline lasers.

20 Claims, 1 Drawing Sheet

U.S. Patent June 15, 1993 5,220,576
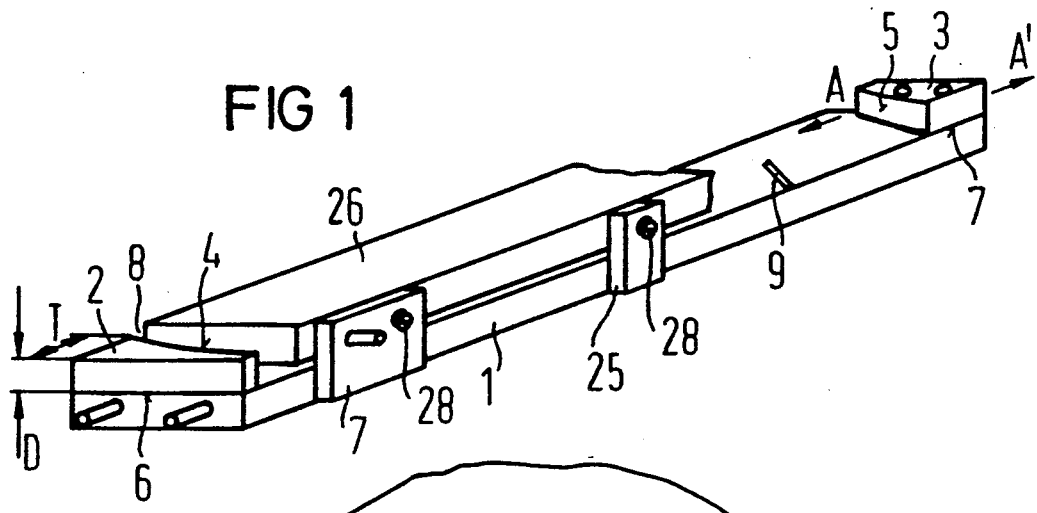
FIG 1
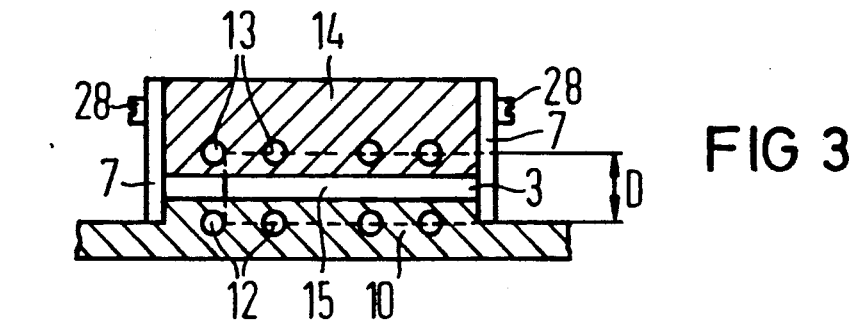
FIG 2
FIG 3

SLAB OR STRIPLINE LASER

BACKGROUND OF THE INVENTION

The present invention is directed to a slab or stripline laser that contains two electrodes and two resonator mirrors, whereby the electrodes define a discharge gap and form waveguide surfaces for the laser emission, and whereby the resonator mirrors immediately adjoin a first electrode. Such a stripline laser is disclosed by German Published Application 37 29 053. Both electrodes therein extend directly to the mirror and the electrical insulation between the two electrodes represents the mirror itself. As a result, the heat elimination in the mirror is affected and, thus obtainable power of the laser is limited.

U.S. Pat. No. 4,713,825 discloses that a $CO_2$ waveguide laser be equipped with an optical bank of "Invar" rods and that the laser mirrors be secured to these. This structure requires adjustment devices for the laser mirrors and a minimum spacing of the mirrors from the waveguide in order to allow space for the temperature expansion of the waveguide.

SUMMARY OF THE INVENTION

It is an object of the present invention to provide an increase in the specific power, i.e. the power per volume of a stripline laser in combination with a compact, simple structure. In a laser of the type initially cited, this object is achieved by a stripline laser wherein the first electrode is executed shape-stable, and carries the mirrors and a second electrode, wherein the mirrors are adjusted relative to the first electrode and are firmly and mechanically anchored on it.

In the structure of the present invention, only the first electrode is externally supported. The second electrode and the mirrors are supported only on the first electrode. This structure renders harmless stresses that can be transmitted to the electrodes due to the mounting. It prevents different deformations of the two electrodes due to external stresses. At least one mirror is thereby advantageously glued onto the first electrode or is clamped by a holding mechanism or is soldered onto the first electrode. The second mirror can also be secured in the same manner or in another manner as the first mirror. The recited ways of fastening the mirrors enable an extremely exact positional adjustment before the fastening, the position of the mirrors then being fixed. The first electrode is executed so shape-stable that no inadmissible migration of the laser beam and no inadmissible attenuation of the laser power caused as a result thereof occurs during operation of the laser even for temperature fluctuations. Except for the minimum spacing required for electrical insulation, the mirrors can be brought close to the second electrode. This structure completely avoids losses due to divergence of the beam of the laser emission in the region of the first electrode and minimizes them in the region of the second electrode. This yields a considerable increase in the laser power per volume.

An advantageous embodiment of a laser of the present invention has the features that the first electrode essentially has the U-shaped cross section, that a part of the profile adjoining the symmetry plane forms an elevation at the outside wall of the U-profile, that cooling channels are accommodated in the region of this elevation, and that connecting channels for the coolant intended for cooling the second electrode are located outside the cooling channels in the region of the end face of the laser. The U-profile having an elevation in its middle region guarantees an especially great stiffness in the discharge gap, enables the accommodation of connections for the coolant of the second electrode without producing a disturbing bending via the coolant connections. Moreover, this embodiment can be fashioned especially compact in that the U-profile simultaneously serves as part of the laser housing.

Advantageously, the coolant admissions for both electrodes are located on the one side and the coolant discharges for both electrodes are located on the other side of the symmetry plane of the U-profile. This embodiment is especially low in mechanical stresses in the U-profile even given temperature differences in the electrodes that occur during operation.

A further enhancement in the laser's freedom from warping is established in that the second electrode is mechanically joined to the first electrode via spacers of insulating material and is held at the desired distance, in that the first electrode is longer in the beam direction of the laser than the second electrode, in that the mirrors in the beam direction are located on the first electrode outside the second electrode and electrically insulated from it, in that the mirrors are composed of metal and are fashioned thicker than the gap width of the discharge gap. It is particularly advisable that the gap width is less than 2 mm and that the thickness of the mirrors is approximately 5 mm and that the mirrors are composed of pure copper. This embodiment guarantees a uniform elimination of heat arising in the mirror without creating a warp of the mirrors. The relatively great thickness of the mirrors contributes to this even when the mirrors have only one side connected to an electrode that serves as a heat sink.

A compensation of stresses for temperature changes is guaranteed in that the geometrical moment of inertia of the two electrodes is the same with reference to the discharge gap and in that the spacing of the cooling channels from that surface of each electrode facing toward the discharge gap is of the same size. It is advantageous for further reduction of mechanical stresses when the coolant admission and the coolant discharge of both electrodes are located at one and the same end face of the first electrode and when admission and discharge of the second electrode are guided, with reference to the discharge gap, vertically above spacers lying between the electrodes and are guided from the first electrode to the second electrode at the same spacing from the end face of the second electrode.

A uniform cooling of the laser gas is achieved in that both electrodes contain cooling channels, and in that the cooling channels of the two electrodes have the same spacings from the discharge gap. The cooling channels of both electrodes thereby advantageously have the same cross section. An especially low deformation for temperature fluctuations occurs when the cooling channels are mirror-symmetrically arranged with reference to the discharge gap.

An advantageous method for manufacturing a slab or stripline laser of the present invention has the features that mirrors are employed each of which has a cylindrical reflection face, in that a connecting surface of every mirror is fashioned residing vertically relative to the axis of the reflection face with high precision, in that the connecting surface is put in place on the first electrode, in that the focal spot of the first electrode is adjusted to the desired beam direction and to the desired position on the electrode by pivoting the mirror relative to the first electrode, and in that a permanent fixing of the mirror on the electrode is then undertaken. Every mirror is thereby advantageously adjusted with a laser beam that indicates the desired beam direction and the desired position of the beam on the first electrode.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 is a perspective view of the structure of a stripline laser of the present invention and illustrates the novel adjustment method;

FIG. 2 is a cross-sectional perspective view of a stripline laser of the present invention; and FIG. 3 is a cross-sectional view through the laser of FIG. 2.

DESCRIPTION OF THE PREFERRED EMBODIMENT

Resonator mirrors 2 and 3 are put in place on a first electrode 1 that is executed shape-stable. The resonator mirrors 2 and 3 have respective cylindrical surfaces 4 and 5, the cylindrical surface 4 of the resonator mirror 2 being concavely arced and the cylindrical surface 5 of the resonator mirror 3 being convexly arced. The two cylinder surfaces 4 and 5 have axes (not shown) that reside vertically with high precision on connecting surfaces 6 or 7, respectively, of the mirrors 2 or 3, respectively. For example, the deviation from rectangularity amounts to only approximately 10 angular seconds. This high precision can be achieved given a depth T of the mirror of, for example, 10 mm.

The first electrode 1 carries a second electrode 26 via spacers 25 that are composed of insulating material, particularly a ceramic. The electrode 26 leaves insulating gaps 8 free vis-a-vis the mirrors 2 and 3. The insulating gaps 8 are kept as small as possible in order to avoid leakage. Given the radius values of the mirrors of several meters that are practically utilized, the curvature of the mirror surfaces is so slight that a cuboid shape of the second electrode 26 is adequate in many instances in order to generate high-power lasers. If necessary, the electrode shape could also be adapted to the shape of the mirrors.

One possibility for adjusting the mirrors is established before the second electrode 26 is fixed in place, for example, by screws 28 and before the ultimate fastening of the mirrors. Known interferometers can be utilized for this purpose. For example, the mirror 3 is thereby pivoted in the direction A or, respectively, A'. The mirrors 2, 3 are ultimately fixed after the adjustment. The mirror 2, for example, is glued or soldered. The mirror 3 is clamped fast after the adjustment with a holding mechanism that is composed of two screws in this case and is thus held in position. The standard tolerances are thereby adequate for the adjustment.

In the exemplary embodiment of FIGS. 2 and 3, the first electrode 10 has an essentially U-shaped cross section. The region 11 of the U-profile adjoining the symmetry plane has an elevation at the outside wall of the U-shape. Cooling channels 12 are accommodated in the region of this elevation. Cooling channels 13 having an identical cross section are accommodated in the second electrode 14 and are mirror-symmetrically arranged vis-a-vis the cooling channels 12 in the first electrode 10 with reference to the discharge gap 15. Spacers 7 define the spacing between the electrodes 10 and 14. The spacers 7 are composed of insulating material, particularly ceramic. The mirror 3 projects slightly laterally beyond the electrodes 10 or, respectively, 14 and has a thickness D that is greater than the thickness of the discharge gap 15.

Coolant admissions 16 and 17 are located at one side of the symmetry plane of the electrode 10, whereas the coolant discharges 18 or 19, respectively, of the first electrode 10 or of the second electrode 14, respectively, are located at the other side of the symmetry plane. Coolant admissions 17 or coolant discharge 19, respectively, for the second electrode 14 initially proceed through the U-profile of the first electrode 10 outside its elevation 11 in the region of the symmetry plane. They depart the first electrode via ceramic bushings 20 and proceed via pipe sections 21 through spacers 7 into the second electrode 14. Coolant admission and discharge lie in the proximity of the end face 22 of the second electrode 14.

The U-profile of the first electrode 10 has end regions 23 having reduced cross section. A housing cap 24 that completes the vacuum-tight housing of the laser is welded or soldered to the end regions 23.

The invention is not limited to the particular details of the apparatus and method depicted and other modifications and applications are contemplated. Certain other changes may be made in the above described apparatus and method without departing from the true spirit and scope of the invention herein involved. It is intended, therefore, that the subject matter in the above depiction shall be interpreted as illustrative and not in a limiting sense.

What is claimed is:

1. A slab or stripline laser having two electrodes and two resonator mirrors, the two electrodes defining a discharge gap and forming waveguide surfaces for laser emission, and the resonator mirrors immediately adjoining a first electrode of the two electrodes, comprising: the first electrode being shape-stable; the first electrode carrying the mirrors and a second electrode of the two electrodes; the mirrors adjusted relative to the first electrode, being firmly an d mechanically anchored on the first electrode.

2. The laser according to claim 1, wherein at least one mirror of the two resonator mirrors is glued onto the first electrode.

3. The laser according to claim 1, wherein at least one mirror of the two resonator mirrors is clamped fast onto the first electrode by a retainer means.

4. The laser according to claim 1, wherein at least one mirror of the two resonator mirrors is soldered onto the first electrode.

5. The laser according to claim 1, wherein the first electrode has a cross-sectional configuration having a main body with end sections extending from ends of the main body in a first direction and a center section extending from substantially a center of the main body in an opposite direction to the first direction; wherein cooling channels are accommodated in the region of the center section; and wherein connections for the coolant for cooling the second electrode are located outside the cooling channels in a region of an end face of the laser.

6. The laser according to claim 5, wherein the geometrical moment of inertia of the two electrodes is of the same size with reference to the discharge gap; and wherein the spacing of the cooling channels from that surface of each electrode facing toward the discharge gap is of the same size.

7. The laser according to claim 5, wherein the coolant admission and the coolant discharge of both electrodes are located at one and the same end face of the first electrode; and wherein coolant admission and coolant discharge of the second electrode are guided, with reference to the discharge gap, vertically over spacers lying between the electrodes and are guided from the first electrode to the second electrode at the same distance from the end face of the second electrode.

8. The laser according to claim 5, wherein legs of the U-profile have end regions having reduced cross section; and wherein the end regions are welded or soldered vacuum-tight to a housing hood.

9. The laser according to claim 5, wherein coolant admissions for the two electrodes are located at one side and coolant discharges for the two electrodes are located at the other side of a symmetry plane of the cross-sectional configuration of the first electrode.

10. The laser according to claim 1, wherein the second electrode is mechanically and firmly joined to the first electrode via spacers composed of insulating material and is held at a desired distance therefrom; wherein the first electrode is longer in a beam direction of the laser than the second electrode; wherein the mirrors are located on the first electrode in the beam direction outside the second electrode and are electrically insulated therefrom; and wherein the mirrors are composed of metal and are thicker than a gap width of the discharge gap.

11. The laser according to claim 10, wherein the gap width is less than 2 mm and the thickness of the mirrors is approximately 5 mm; and wherein the mirrors are composed of pure copper.

12. The laser according to claim 1, wherein the two electrodes contain cooling channels; and wherein the cooling channels of the two electrodes have the same spacings from the discharge gap.

13. The laser according to claim 12, wherein the cooling channels are mirror-symmetrically located with reference to the discharge gap.

14. The laser according to claim 1, wherein the two electrodes contain cooling channels; and wherein the cooling channels of the two electrodes have the same cross section.

15. The laser according to claim 14, wherein the cooling channels are mirror-symmetrically located with reference to the discharge gap.

16. The laser according to claim 1, wherein the shape of the second electrode is adapted to the shape of the surface of the mirrors, so that a gap of constant gap width remains free between the second electrode and mirrors.

17. A method for manufacturing a slab or stripline laser comprising the steps of: providing two mirrors each of which has a cylindrical reflection face; fashioning with a connecting surface of each mirror residing vertically relative to an axis of the reflection face; putting the connecting surface in place on a first electrode; adjusting the focal spot of the first electrode to the desired beam direction and setting the desired position on the electrode by pivoting the mirror relative to the first electrode; and permanently fixing the mirror on the first electrode.

18. The method according to claim 17, wherein each mirror is adjusted with a laser beam that indicates the desired beam direction and the desired position of the beam on the first electrode.

19. A slab or stripline laser having two electrodes and two resonator mirrors, the two electrodes defining a discharge gap and forming waveguide surfaces for laser emission, and the resonator mirrors immediately adjoining a first electrode of the two electrodes, comprising: the first electrode being shape-stable and having a cross-sectional configuration having a main body with end sections extending from ends of the main body in a first direction and a center section extending form substantially a center of the main body in an opposite direction to the first direction; cooling channels accommodated in the region of the center section; the first electrode carrying the mirrors and a second electrode of the two electrodes; the second electrode mechanically and firmly joined to the first electrode via spacers composed of insulating material and held at a desired distance therefrom, the first electrode being longer in a beam direction of the laser than the second electrode; the mirrors, adjusted relative to the first electrode, being firmly and mechanically anchored on the first electrode, the mirrors being located on the first electrode in the beam direction outside the second electrode and electrically insulated therefrom, and being composed of metal and thicker than a gap width of the discharge gap; connectors for a coolant for cooling the second electrode located outside the cooling channels in a region of an end face of the laser; coolant admission and coolant discharge of both electrodes located at one and the same end face of the first electrode; coolant admission and coolant discharge of the second electrode guided, with reference to the discharge gap, vertically over spacers lying between the electrodes and guided from the fist electrode to the second electrode at the same distance from the end face of the second electrode.

20. The laser according to claim 19, wherein at least one mirror of the two resonator mirrors is glued onto the first electrode.

* * * * *